Jan. 21, 1964     S. G. A. LINDQVIST     3,118,156
ROWLOCKS
Filed April 16, 1962
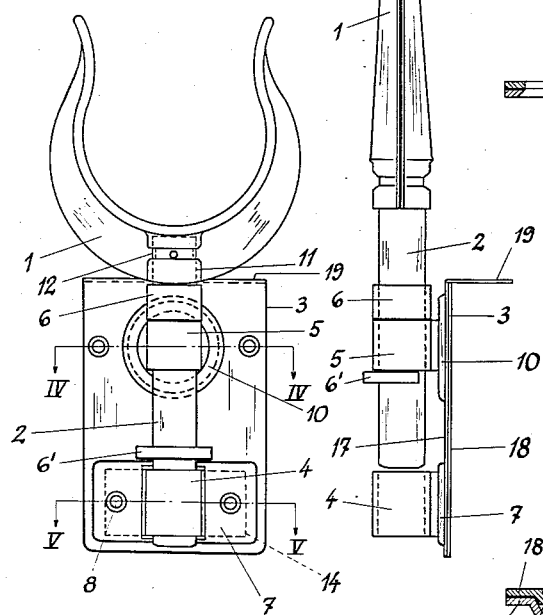
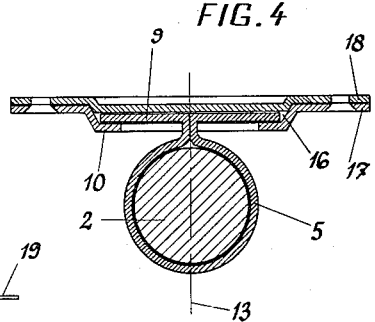
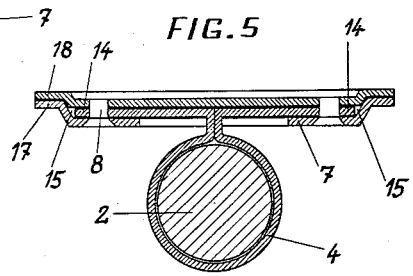
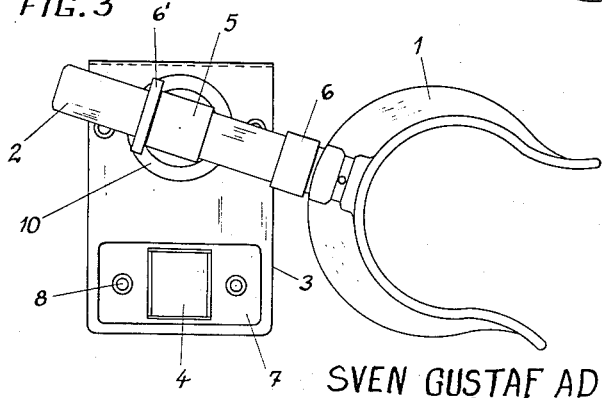
INVENTOR
SVEN GUSTAF ADOLF LINDQVIST
By Linton and Linton
ATTORNEYS

United States Patent Office 3,118,156
Patented Jan. 21, 1964

3,118,156
ROWLOCKS
Sven Gustaf Adolf Lindqvist, Kordaverken, Svanesund, Sweden
Filed Apr. 16, 1962, Ser. No. 187,765
Claims priority, application Sweden May 2, 1961
2 Claims. (Cl. 9—26)

The present invention relates to rowlocks and particularly to such rowlocks as are rotatably and swingably connected to a mounting member adapted to be attached to the gunwale of a boat in such a manner that the rowlock is movable to an upright, operative position above the gunwale or to a down, inoperative position below the gunwale.

One object of the invention is to provide a new connecting device between the rowlock and mounting member permitting the movement from operative to inoperative position and vice versa by a simple manipulation and which is simple in construction and cheap in manufacture.

Another object of the invention is to provide a connection of said kind which will give the rowlock an efficient support when in its operative position.

A further object of the invention is to provide a rowlock of said kind in which substantial parts of the connecting device between the stem of the rowlock and said mounting member are preferably made from sheet metal by pressing operations permitting a simple but effective mounting of the rowlock on the mounting member.

Other objects of the invention will be made clear by the following description with reference to the accompanying drawing illustrating by way of example an embodiment of the invention. In the drawing, FIG. 1 is a front view of the rowlock carried by the mounting member. FIG. 2 is a side elevation of the same parts, the rowlock with its stem being in an elevated position. FIG. 3 is a front view showing the rowlock in the down or inoperative position. FIG. 4 is a section on the line IV—IV, and FIG. 5 a section on the line V—V of FIG. 1, FIGS. 4 and 5 being shown on a larger scale than the other figures.

The rowlock 1 and the mounting member 3, which is to be secured to the gunwale of the boat are formed by pressing sheet metal. The rowlock is formed from a double-folded sheet metal piece and is held in its pressed shape by spot welding or the like. It is formed on its under side with a sleeve 11 receiving the stem 2 which has an annular groove in which the sheet metal of said sleeve is pressed as shown at 12 for rigidly securing the parts 1 and 2.

The stem 2 is slidably and rotatably fitted in two spaced tubular sockets or bushings viz. a lower bushing 4 rigidly secured to the mounting member 3 and in an upper bushing 5 which is rotatably connected to the same member about an axis 13 substantially perpendicular to the longitudinal axis of the bushing 5 and the stem 2.

The lower fixed bushing 4 is formed from a strip of sheet metal the ends 14 of which are fitted in pockets 15 formed between a protruding portion 7 of a front sheet metal plate 17 of the member 3 and a back plate 18 fastened by its flat surface for example by spot welding to the back side of the plate 17 and forming the back wall of the pockets 15. The plates 17, 18 and the end portions 14 of said strip have holes 8 for screws by which the mounting member 3 is attached to the gunwale of a boat.

The upper bushing 5 is secured to a circular bearing plate 9 the peripheral portion of which is fitted in a corresponding circular bearing cup 16 formed by a protruding portion 10 of the plate 17 and covered on the back side by the plate 18. Said plate 9 is rotatable about the axis line 13. Also the bushing 5 and the plate 9 may be formed integrally with each other.

The stem 2 has a stop member 6, which may be slidable between the sleeve 11 and the upper bushing 5, and a fixed stop member 6' on the stem portion between the bushings 4 and 5.

When the rowlock is in its upright or operative position its stem 2 engages with both bushings 4, 5 and is rotatable in these bushings. When the rowlock 1 is to be moved to an inoperative position i.e. a position below the gunwale, the rowlock is slid longitudinally upwards so as to disengage the lower end of the stem 2 from the lower bushing 4. The rowlock 1 with the stem 2 is then swung about the horizontal axis 13 and in a vertical plane parallel with the longitudinal direction of the gunwale. The stop member 6' prevents the disengagement of the rowlock from the bushing 5. In this position of the rowlock (FIG. 3) the upper surface of the gunwale is clear of projections formed by the rowlock.

In the operative position of the rowlock the socket-shaped stop member 6 will bear on the upper bushing 5 and hold the rowlock in a height permitting rotation of the rowlock without any bar by the top end 19 of the member 3. In this position the stem 2 will have a strong lateral support by the two spaced bushings 4, 5.

The parts, except the stem 2, may be manufactured from sheet metal by simple pressing operations and a cheap final product will be attained also in the use of a high quality sheet metal such as stainless steel.

The details of the invention may be varied without departing from the spirit of the invention.

What I claim is:

1. A rowlock having a stem, a mounting member provided by a pair of superposed sheet metal members, one of said sheet metal members having an annular raised portion spaced from the other sheet metal member providing a bearing cup therebetween and an annular opening in said bearing cup, said one of said sheet metal members also having a second raised portion with an opening providing a pair of spaced apart pockets, a bushing, a bearing plate connected to said bushing rotatably positioned within said bearing cup and extending through said annular poening, a second bushing, a strip connected to said second bushing positioned within said pockets and extending through said opening in said second raised portion and said oarlock stem slidably extending through said bushings in use and detachable from said second bushing whereby said bearing plate can rotate in said bearing cup pivoting said oarlock to a storage position and means for attaching said sheet metal members together and to a boat hull.

2. A rowlock as claimed in claim 1 wherein said attaching means consists of a plurality of corresponding holes through said sheet metal members and said strip and fastening screws for extending through said holes into the boat hull.

References Cited in the file of this patent
UNITED STATES PATENTS

| | | |
|---|---|---|
| 308,600 | Fenner | Dec. 2, 1884 |
| 1,787,734 | Rowling | Jan. 6, 1931 |